(12) United States Patent
Takamura et al.

(10) Patent No.: US 7,617,087 B2
(45) Date of Patent: Nov. 10, 2009

(54) MEMORY MANAGEMENT METHOD FOR DYNAMIC CONVERSION TYPE EMULATOR

(75) Inventors: Akihiro Takamura, Tokyo (JP); Yoshio Miki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 639 days.

(21) Appl. No.: 10/933,218

(22) Filed: Sep. 3, 2004

(65) Prior Publication Data

US 2005/0160407 A1 Jul. 21, 2005

(30) Foreign Application Priority Data

Jan. 15, 2004 (JP) ............... 2004-007460

(51) Int. Cl.
*G06F 9/455* (2006.01)
*G06G 9/45* (2006.01)
(52) U.S. Cl. ....................... 703/26; 717/158
(58) Field of Classification Search .......... 703/26, 703/23; 717/158
See application file for complete search history.

(56) References Cited

U.S. PATENT DOCUMENTS

| | | | | |
|---|---|---|---|---|
| 5,721,855 | A * | 2/1998 | Hinton et al. ........... | 712/218 |
| 6,075,937 | A * | 6/2000 | Scalzi et al. ........... | 703/23 |
| 6,453,278 | B1 * | 9/2002 | Favor et al. ........... | 703/27 |
| 6,463,582 | B1 * | 10/2002 | Lethin et al. .......... | 717/158 |
| 6,704,925 | B1 * | 3/2004 | Bugnion ............... | 717/138 |

FOREIGN PATENT DOCUMENTS

JP A-10-187460 7/1998

* cited by examiner

*Primary Examiner*—Kidest Bahta
*Assistant Examiner*—Juan C Ochoa
(74) *Attorney, Agent, or Firm*—Antonelli, Terry, Stout & Kraus, LLP.

(57) ABSTRACT

A construction of the present invention includes a procedure of setting in advance a storing area in a converted instruction storing area table for recording a corresponding relation between a program before conversion and a storing address of a converted program at an initialization processing portion of an emulation program. In setting the storing area, address information on a memory on a portion whose execution frequency is high upon an emulation operation is acquired, and an address that brings about cache conflict on an instruction cache with the portion whose execution frequency is high is excepted and set as an area to store therein a converted instruction.

7 Claims, 12 Drawing Sheets

- 100 PROCESSOR
- 101: INSTRUCTION CACHE
- 120 MEMORY
- 200: EMULATION PROGRAM
- 122: HIGH-FREQUENCY EXECUTION ADDRESS TABLE
- 123: INSTRUCTION CACHE CONSTRUCTION TABLE
- 124: CONVERTED INSTRUCTION STORING AREA TABLE
- 125: INSTRUCTION CACHE USE WAY TABLE

FIG. 4

122 HIGH-FREQUENCY EXECUTION ADDRESS TABLE

| | START ADDRESS | END ADDRESS |
|---|---|---|
| CONVERTED INSTRUCTION RETRIEVAL PROCESSING | 0x10001104 | 0x100012ff |
| CONVERTED INSTRUCTION EXECUTION PROCESSING | 0x10011228 | 0x10011357 |
| ⋮ | | |
| | | |
| | | |

FIG. 5

123 INSTRUCTION CACHE CONSTRUCTION TABLE

| | |
|---|---|
| CAPACITY (Byte) | 0x10000 |
| WAY NUMBER | 2 |
| LINE SIZE (Byte) | 128 |

124 CONVERTED INSTRUCTION STORING AREA TABLE

| | CONVERSION START ADDRESS | CONVERTED INSTRUCTION STORING ADDRESS |
|---|---|---|
| #0 | 0x00000040 | 0x12001000 |
| #1 | 0x00001210 | 0x12001204 |
| #2 | 0x0000f0c8 | 0x12001408 |
| #3 | 0x0000007c | 0x12001810 |

FIG. 7

125 INSTRUCTION CACHE USE WAY TABLE

| | USE WAY NUMBER |
|---|---|
| #0 | 0 |
| #1 | 0 |
| #2 | 0 |
| ⋮ | ⋮ |
| #33 | 0 |
| #34 | 1 |
| #35 | 1 |
| #36 | 2 |
| #37 | 2 |
| #38 | 1 |
| #39 | 0 |
| ⋮ | ⋮ |
| #254 | 0 |
| #255 | 0 |

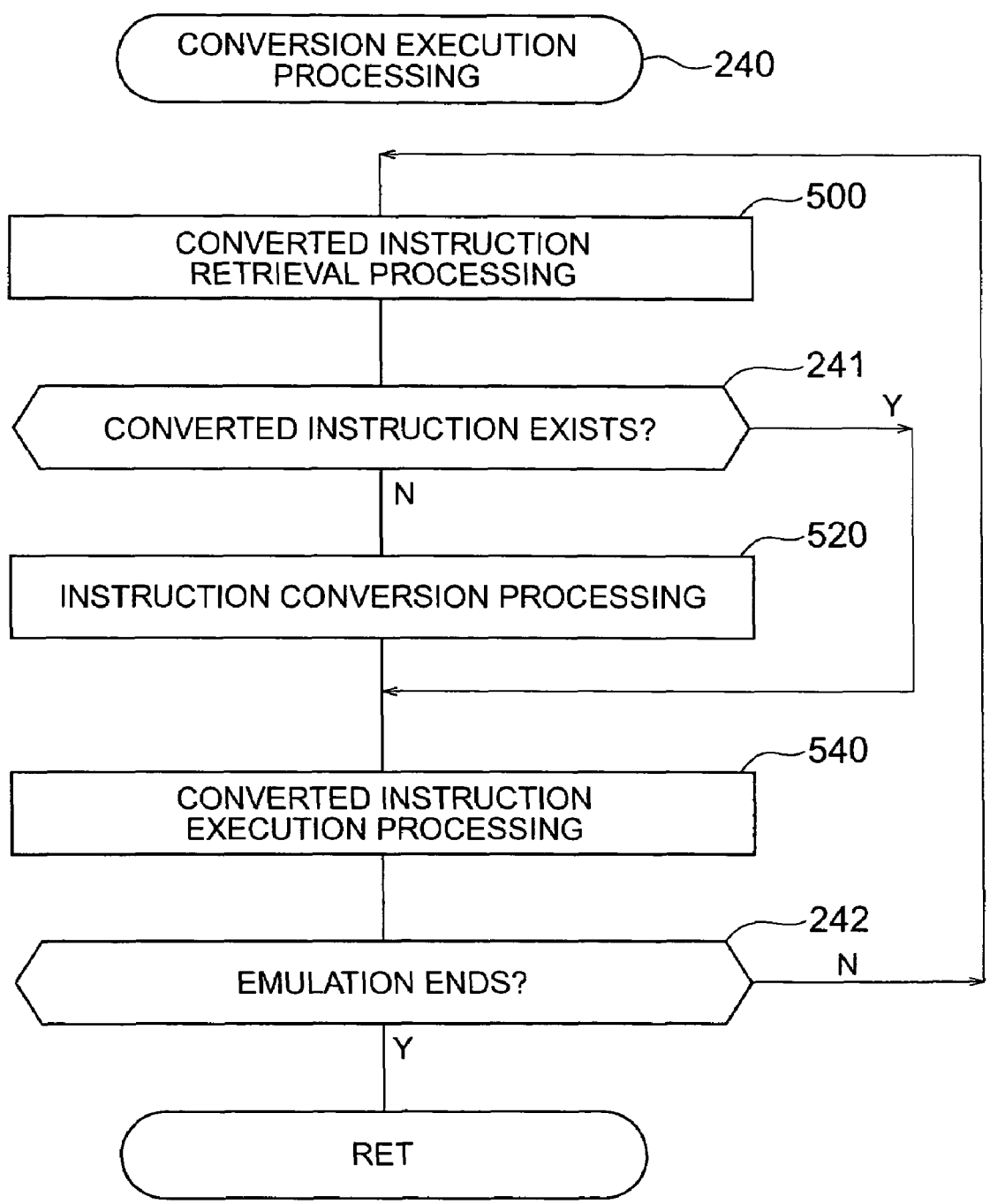

MEMORY MANAGEMENT METHOD FOR DYNAMIC CONVERSION TYPE EMULATOR

INCORPORATION BY REFERENCE

The present application claims priority from Japanese application JP2004-007460 filed on Jan. 15, 2004, the content of which is hereby incorporated by reference into this application.

BACKGROUND OF THE INVENTION

The present invention relates to a computer system for executing, with a processor capable of executing a first instruction set, a program described for a second instruction set.

In general, a computer program is prepared on the premise that it is operated on a specific instruction set. However, computer hardware may get out of order due to aged deterioration. Thus, for using the program successively, introduction of new computer hardware is required. However, there may be a case wherein computer hardware having an instruction set as the premise for the program can not be introduced, for example, because the manufacture of the computer hardware has been terminated.

One method for enabling new computer hardware having a certain instruction set (first instruction set) to substantially execute a program described on the premise of a second instruction set, is conversion of the program into a program described with the first instruction set, i.e., an instruction set native to the computer hardware.

In program conversion methods, there are static conversion method in which the whole of a program is converted before the program is executed, and dynamic conversion method in which a program is converted at need while the program is executed. The static conversion method can not be applied to a case wherein distinction between instructions and data is indefinite, or a case wherein a branch destination address is not determined until the program is executed.

Contrastingly in the dynamic conversion method, the above problems do not arise. However, in accordance with a memory area for storing converted instructions, a problem of instruction cache conflict may arise. This will be described. In the dynamic conversion method, by execution of a program (emulation program) to be subjected to dynamic conversion, first, an instruction storing area for storing converted instruction string is secured on a memory; a program as the conversion object described with the second instruction set is converted into a program of the first instruction set and stored in the above instruction storing area; and instructions in the instruction storing area are executed. In case that additional characters (column numbers) used for retrieve in an instruction cache overlap between an area in the program being dynamically converted, wherein execution frequency is high, and an area for storing converted instructions, when an instruction in the converted instruction storing area is executed, a large number of instruction cache misses may occur and thus the performance may be considerably deteriorated. Such a condition in which a cache misses occurs because a plurality of program regions use the same instruction cache area is called cache conflict.

JP-A-10-187460 discloses a binary program converter of a dynamic conversion type. In the converter, on the basis of information when a program not having been converted, constituted by a plurality of instruction blocks, is executed, the plurality of blocks of the program not having been converted are rearranged. Thereby, instruction cache conflict when the converted program is executed is eliminated to improve the cache hit rate.

SUMMARY OF THE INVENTION

The dynamic conversion method has a problem that there is possibility that the performance is considerably deteriorated due to instruction cache conflict in accordance with address in the converted instruction storing area. Eliminating instruction cache conflict by the technique described in JP-A-10-187460 requires a procedure of acquiring a history (execution trace) of program operations before conversion and analyzing it in a unit of instruction block.

An object of the present invention is to reduce instruction cache conflict without performing any special procedure such as acquisition and analysis of execution trace, and thereby make it possible to obtain stably high performance in a dynamic conversion method.

According to a representative construction of the present invention, a procedure is included of setting in advance a storing area in a converted instruction storing area table for recording a corresponding relation between a program before conversion and a storing address of a converted program at an initialization processing portion of an emulation program. In setting the storing area, address information on a memory on a portion whose execution frequency is high upon an emulation operation is acquired, and an address that brings about cache conflict on an instruction cache with the portion whose execution frequency is high is excepted and set as an area to store therein a converted instruction.

The portion whose execution frequency is high upon an emulation operation is representatively a main loop of the emulation program, for example, a converted instruction retrieval processing portion and a converted instruction execution processing portion. The address that brings about cache conflict is a memory area having the same column number on the instruction cache, that is, the same additional character upon retrieval in the instruction cache, as the portion whose execution frequency is high.

According to the above construction, the main loop of the emulation program and a converted instruction accessed in the main loop do not bring about cache conflict on the instruction cache. Therefore, the number of memory accesses caused by cache misses in an emulation operation is reduced, and stably high performance can be obtained in a dynamic conversion method.

Other objects, features and advantages of the invention will become apparent from the following description of the embodiments of the invention taken in conjunction with the accompanying drawings.

BRIEF DESCRIPTION OF THE DRAWINGS

FIG. 4 is a representation showing contents of a high-frequency execution address table;

FIG. 5 is a representation showing contents of an instruction cache construction table;

FIG. 7 is a representation showing contents of an instruction cache use way table;

FIG. 16 is a flowchart of conversion execution processing.

DETAILED DESCRIPTION OF THE EMBODIMENTS

Figure 1:
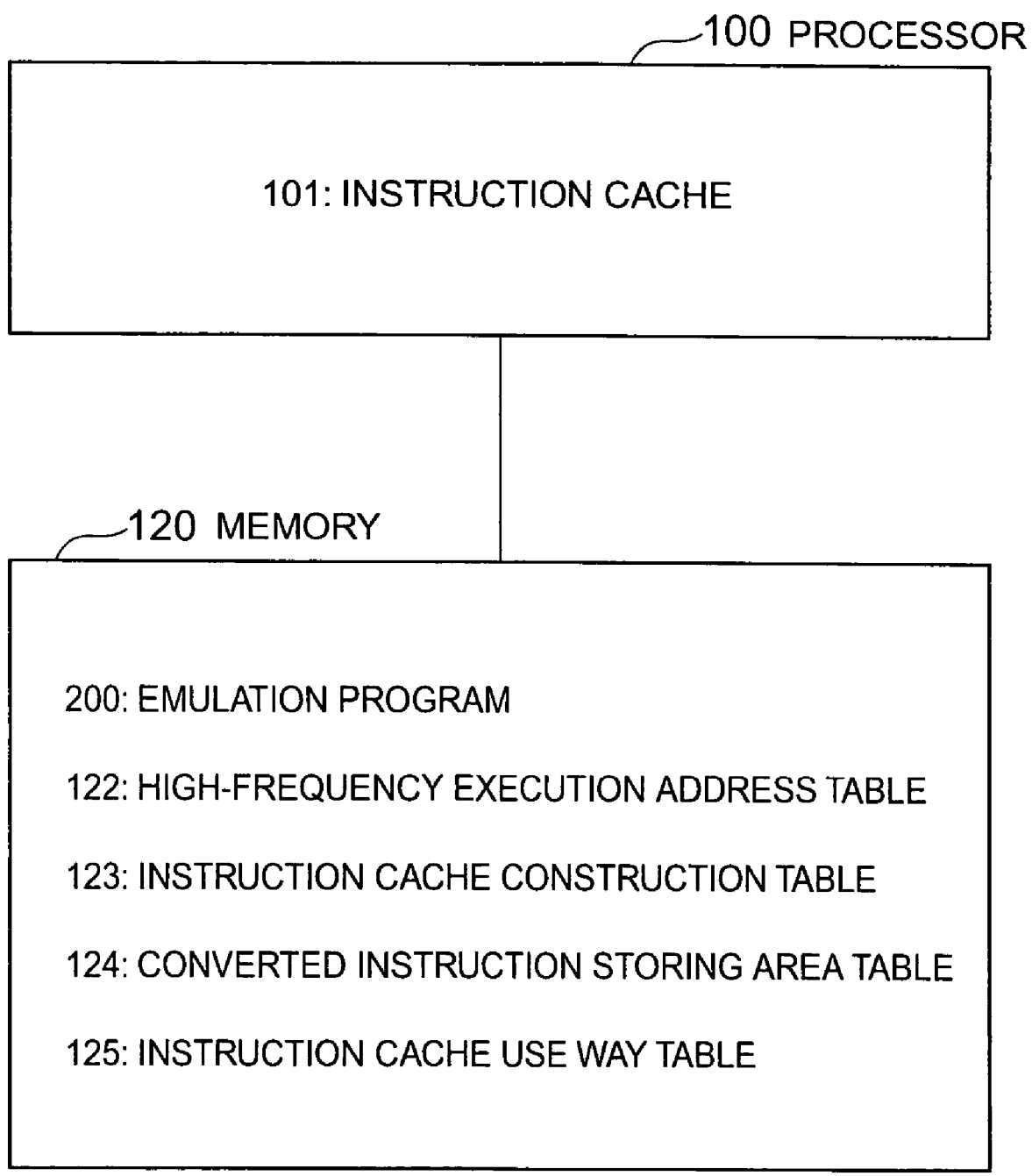
FIG. 1 is a block diagram showing a construction of a computer system according to an embodiment of the present invention.

FIG. 1 shows a computer system used in a first embodiment of the present invention.

The computer system of this embodiment includes a processor 100 and a memory 120.

The processor 100 includes therein an instruction cache 101. The instruction cache 101 is a memory, higher in speed and smaller in capacity than the memory 120, for storing a program read out from the memory 120. By storing a program, lately executed, in the instruction cache 101, in place of reading out it from the memory 120, it can be read out from the instruction cache 101. This can shorten the readout time.

The memory 120 stored therein an emulation program 200, a high-frequency execution address table 122, instruction cache construction information 123, a converted instruction storing area table 124, and a use way table 125.

Figure 2:
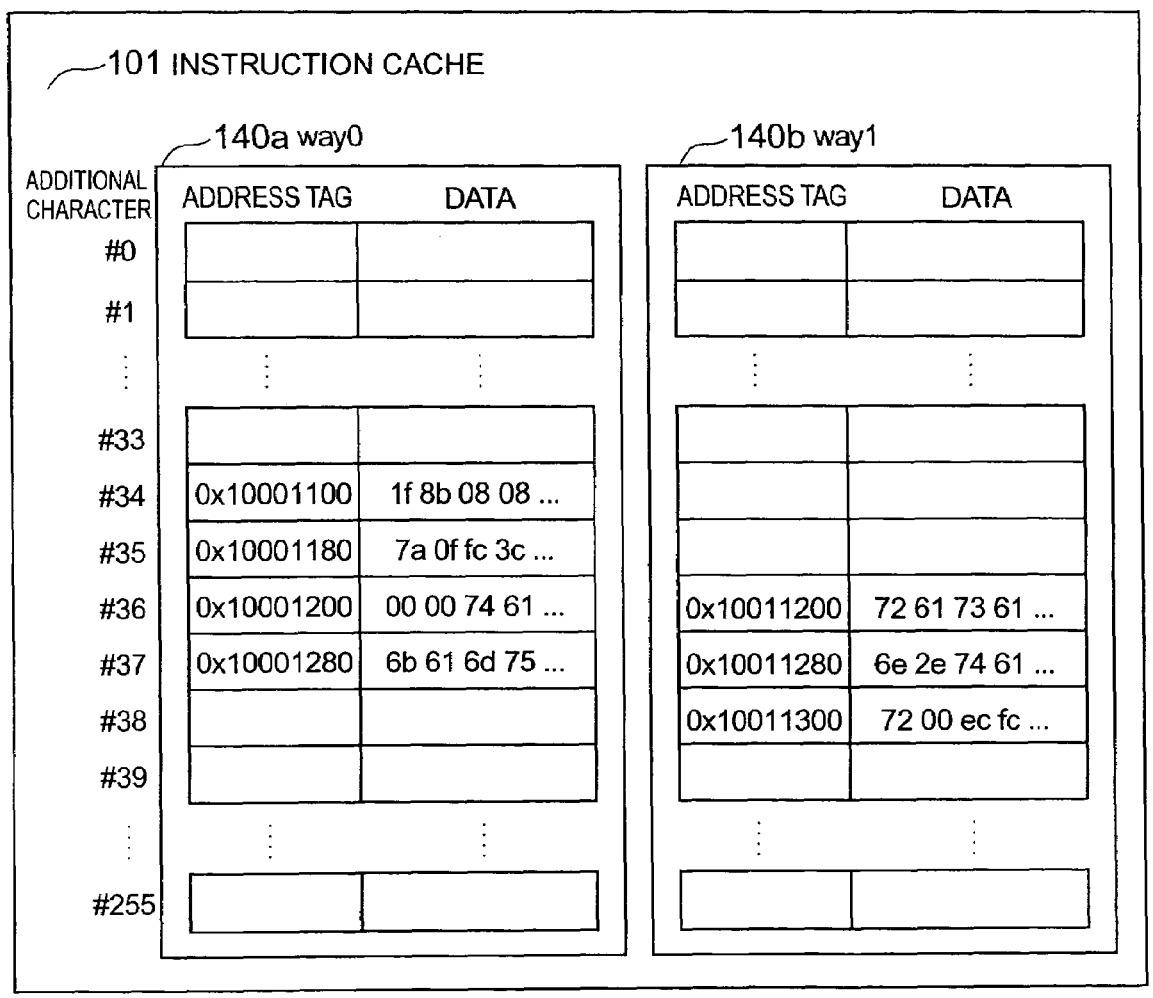
FIG. 2 is a block diagram showing a construction of an instruction cache according to the embodiment.

FIG. 2 shows a construction of the instruction cache of this embodiment. In this embodiment used is a two-way set associative type instruction cache having a capacity of 64 k bytes and a line size of 128 bytes (140*a* and 140*b*), in which logical addresses are used for additional characters for retrieve in the instruction cache, and address tags. The present invention is applicable also to a computer system adopting an instruction cache of other construction and type. One element of the instruction cache is made up of an address tag in which a logical address is stored, and data, corresponding to the line size, whose start address is the above address tag. However, the address tag has a restriction that it must be integral times the line size. In the whole of the instruction cache, there are aggregations of elements, the number of which is (capacity/way number/line size), corresponding to the number of ways.

When data corresponding to a certain logical address is read out from the instruction cache, first, AND between the logical address and (capacity/way number-1) is obtained, and it is used as an additional character. Next, in each way, retrieval is carried out for an address tag of an element corresponding to an additional character, which coincide with the logical address and does not coincide with (line size-1). If an address tag that meets the above conditions is found in a way, this is cache hit and data corresponding to the address tag is read out. If no such address tag is found in any way, this is cache misses, causing delay of the readout operation because the data must be read out from the memory.

Figure 3:
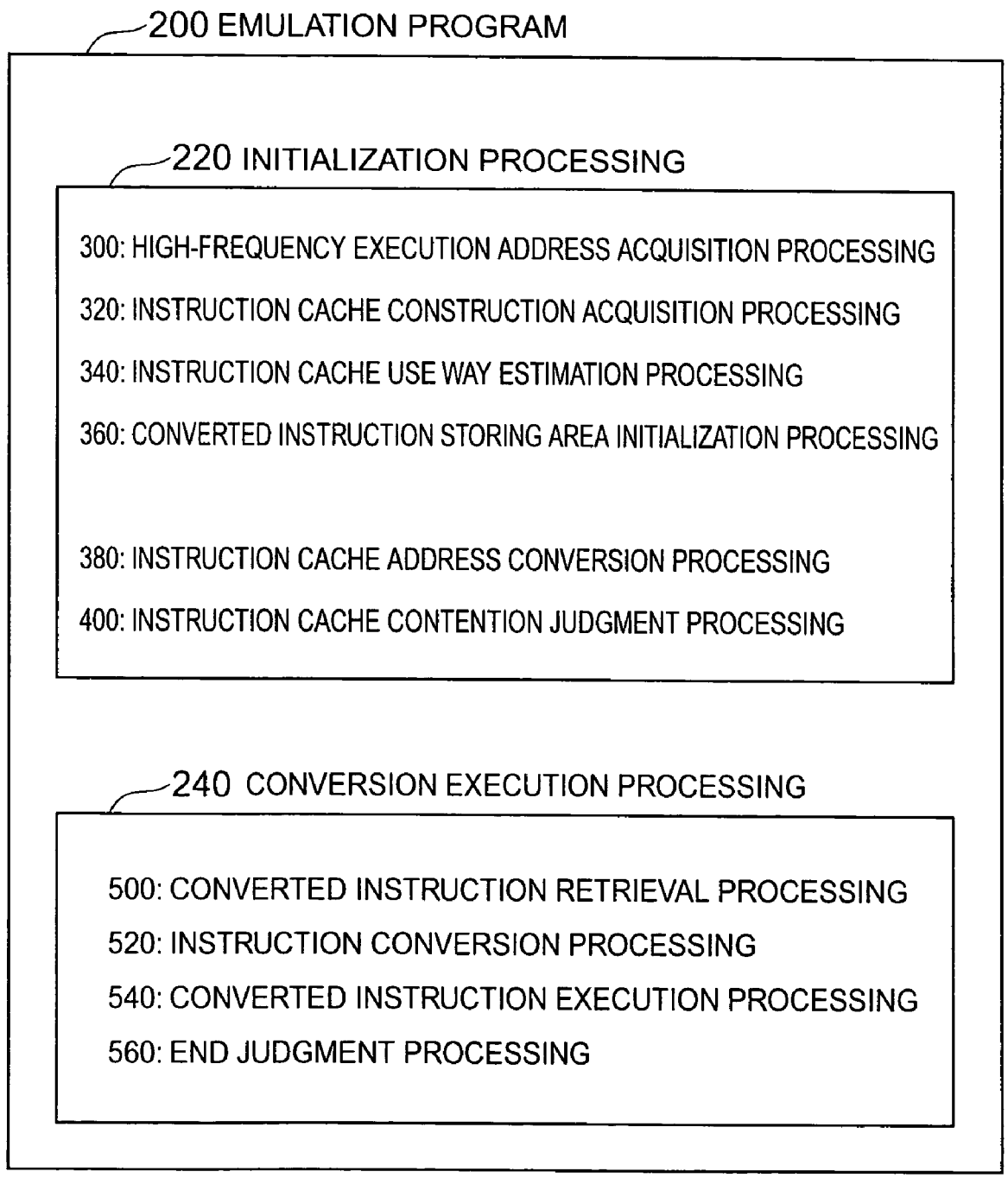
FIG. 3 is a representation showing a construction of an emulation program.

FIG. 3 shows contents of the emulation program 200 of the first embodiment. The emulation program 200 includes initialization processing 220 for initializing variations necessary for emulation, and conversion execution processing 240 for executing emulation by a dynamic conversion method.

The initialization processing 220 includes high-frequency execution address acquisition processing 300, instruction cache construction acquisition processing 320, instruction cache use way-number estimation processing 340, and converted instruction storing area initialization processing 360. The initialization processing 220 further includes instruction cache address conversion processing 380 for converting an instruction cache address, called from the above processings, and instruction cache conflict judgment processing 400.

The conversion execution processing 240 includes converted instruction retrieve processing 500, instruction conversion processing 520, converted instruction execution processing 540, and end judgment processing 560.

FIG. 4 shows details of the high-frequency execution address table 122. The high-frequency execution address table 122 stores therein one or more of start and end addresses of programs in the emulation program, the numbers of executions of which are high. In this example, the numbers of executions of the converted instruction retrieve processing and converted instruction execution processing of the emulation program are high, and it is shown that the start and end addresses of the converted instruction retrieve processing are "0x10001104" and "0x100012ff" and the start and end addresses of the converted instruction execution processing are "0x10001728" and "0x10001857", respectively.

FIG. 5 shows details of the instruction cache construction table 123. For calculating an additional character, used for retrieval of the instruction cache 101, from a logical address in the instruction cache address conversion processing 380, the instruction cache construction table 123 stores therein the capacity, way number, and line size of the instruction cache 101. In this example, it is shown that the capacity is "0x10000" (64 k bytes), the number of ways is one (direct map type), and the line size is 128 bytes.

Figure 6:
FIG. 6 is a representation showing contents of a converted instruction storing area table.

FIG. 6 shows details of the converted instruction storing area table 124. The converted instruction storing area table 124 stores therein one or more of conversion start addresses and converted instruction storing areas. In this example, there are four pairs of conversion start addresses and converted instruction storing addresses, and it is shown that the converted instruction whose conversion start address is "0x00000040" is stored at "0x12001000".

FIG. 7 shows details of the instruction cache use way table 125. The instruction cache use way table 125 records therein the number of ways used by a program registered in the high-frequency execution address table 122, for each additional character used for retrieval in the instruction cache 101. This example shows contents of the instruction cache use way table 125 in case that the program executed at a high frequency is the high-frequency execution address table 122 shown in FIG. 4 and the construction of the instruction cache 101 is the instruction cache construction table 123 shown in FIG. 5, wherein the instruction cache 101 is executed at a high frequency. It is shown that the program has used each of additional characters 34 to 37 and 46 to 48 by one way.

Figure 8:
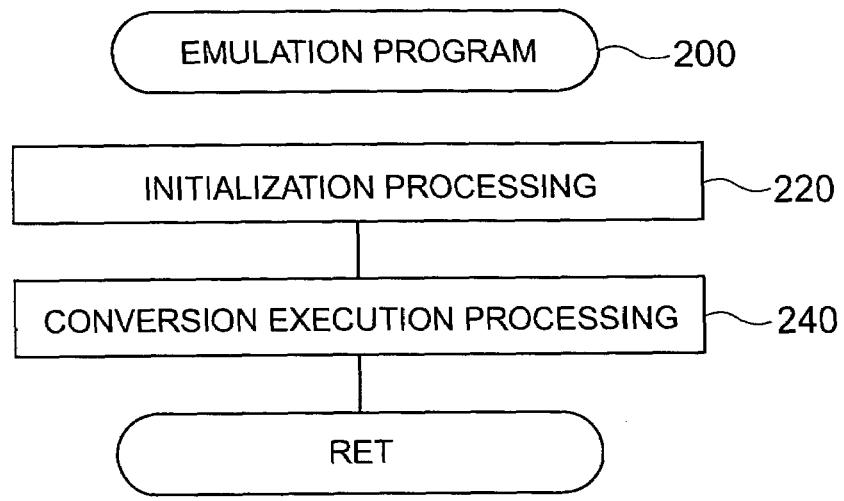
FIG. 8 is a flowchart of the emulation program.

FIG. 8 shows details of an operation procedure of the emulation program 200. The emulation program 200 first executes the initialization processing 220 and then executes the conversion execution processing 240.

Figure 9:
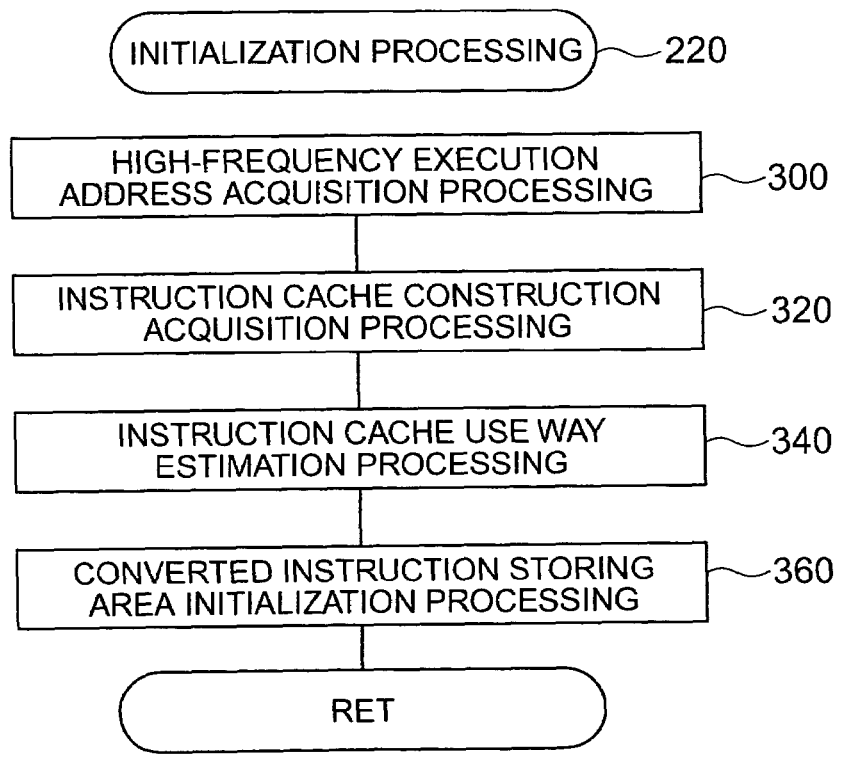
FIG. 9 is a flowchart of initialization processing.

FIG. 9 shows details of an operation procedure of the initialization processing 220. In the initialization processing 220, in the instruction cache 101, a converted instruction storing area that has low possibility of cache conflict with an address executed at a high frequency in the emulation program 200, is registered in the converted instruction storing area table 124. First, by the high-frequency execution address acquisition processing 300, an address executed at a high frequency in the emulation program 200 is acquired and stored in the high-frequency execution address table. Next, by the instruction cache construction acquisition processing 320, construction information (capacity, way number, and line size) of the instruction cache 101 necessary for the instruction cache address conversion processing 380 is acquired and stored in the instruction cache construction information 123.

Further, by the instruction cache use way estimation processing 340, it is calculated out which cache address in the instruction cache 101 is the address executed at a high frequency in the emulation program 200, and the use way number is estimated for each additional character used for cache retrieval. Finally, by the converted instruction storing area initialization processing 360, it is judged whether or not cache conflict occurs with the address executed at a high frequency in the emulation program 200, and only converted instruction storing areas low in possibility of cache conflict are registered in the converted instruction storing area table 124.

Figure 10:
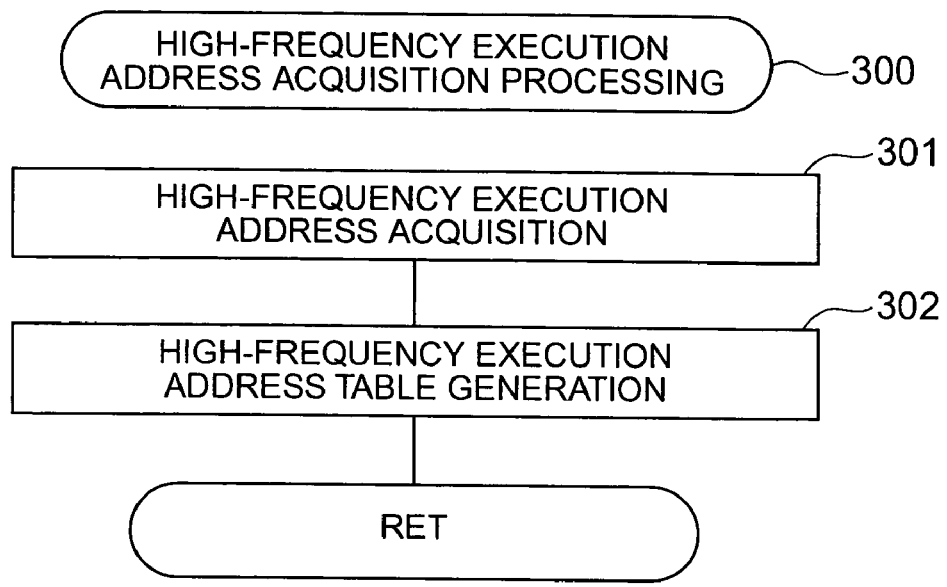
FIG. 10 is a flowchart of high-frequency execution address acquisition processing.

FIG. 10 shows details of the high-frequency execution address acquisition processing 300. In the high-frequency execution address acquisition processing 300, first, by high-frequency execution address acquisition 301, pairs of start and end addresses of one or more programs, whose execution frequency is high, in the emulation program 200 are acquired. As the acquisition method, there are a method in which a program maker embeds the start and end addresses of a program executed at a high frequency, in the high-frequency execution address acquisition 301; and a method in which the start and end addresses of a program executed at a high frequency is recorded in a file and they are read out from the file by high-frequency execution address acquisition 301. Next, by high-frequency execution address table generation 302, the start and end addresses of an acquired program whose execution frequency is high are registered in the high-frequency execution address table 122.

Figure 11:
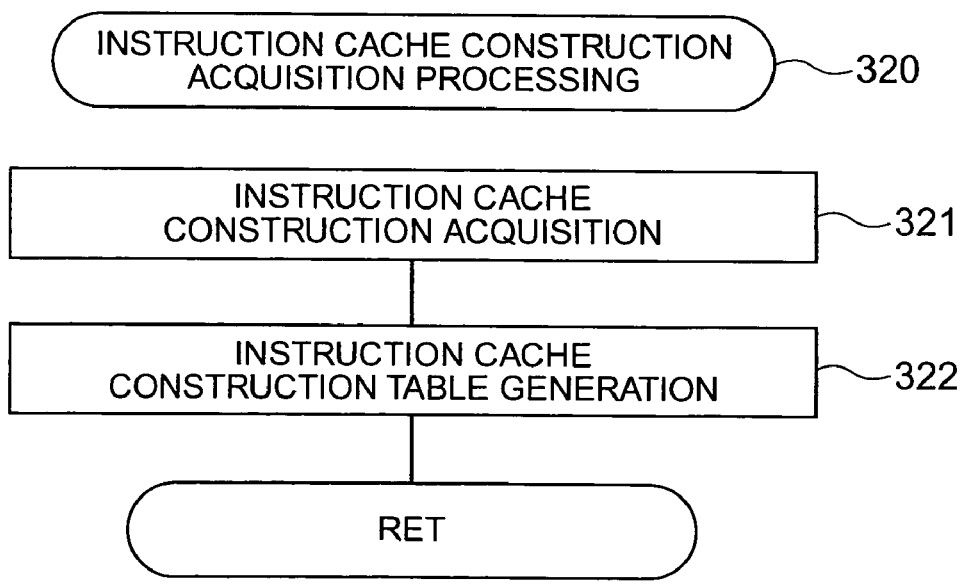
FIG. 11 is a flowchart of instruction cache construction acquisition processing.

FIG. 11 shows details of the instruction cache construction acquisition processing 320. In the instruction cache construction acquisition processing 320, first, by instruction cache construction acquisition 321, the capacity, way number, and line size of the instruction cache 101 are acquired. As the acquisition method, there are a method in which a program maker embeds the construction of the instruction cache 101 of the processor 100 to be used, in the instruction cache construction acquisition 321 at the time of making the emulation program; a method of utilizing instruction cache construction variables prepared by OS; and a method of acquiring using a library that acquires the instruction cache construction, or API (Application Program Interface), prepared by OS. Next, by instruction cache construction table generation 322, the acquired capacity, way number, and line size of the instruction cache 101 are registered in the instruction cache construction table 123.

Figure 12:
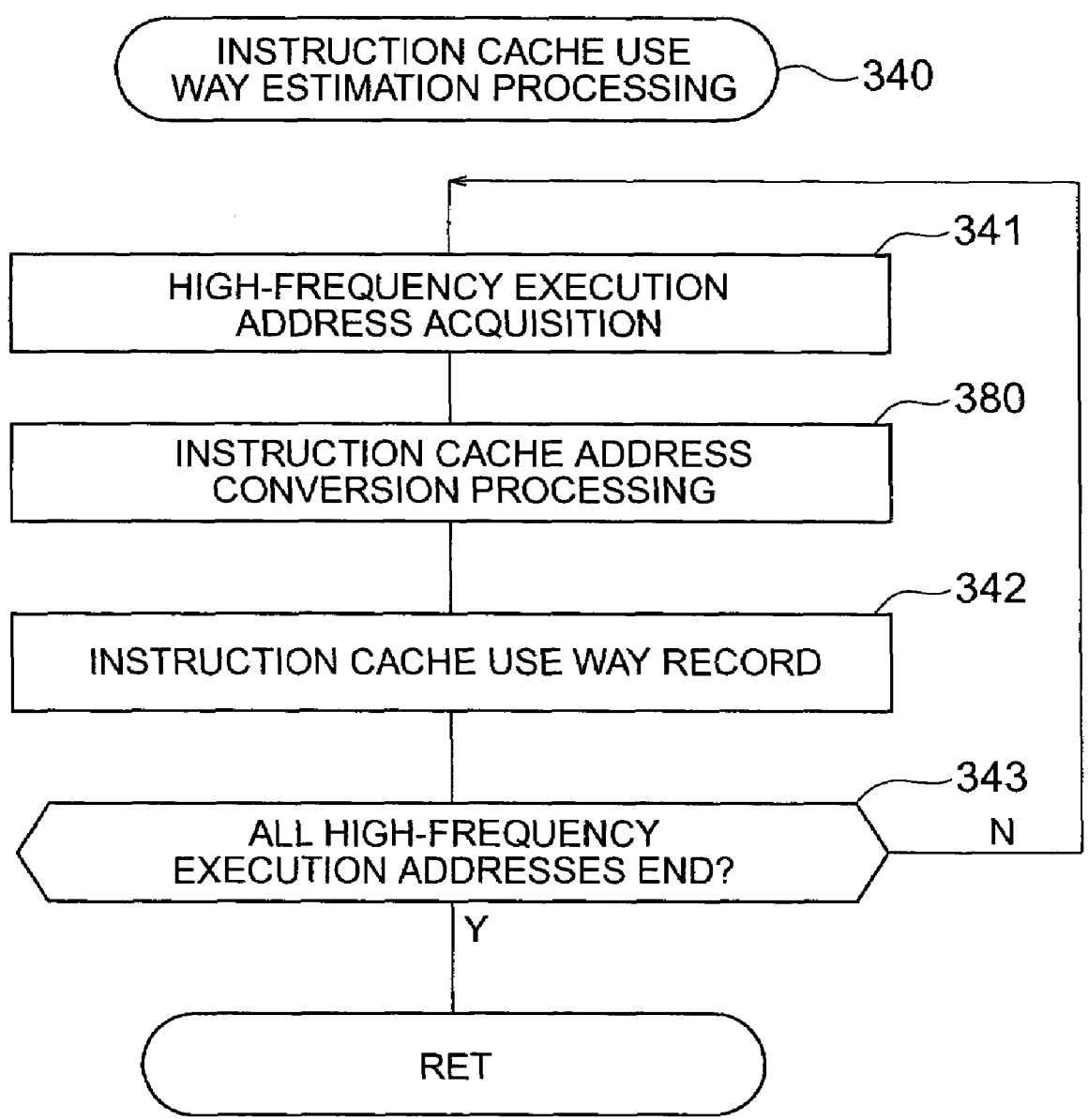
FIG. 12 is a flowchart of instruction cache use way estimation processing.

FIG. 12 shows details of the instruction cache use way estimation processing 340. In the instruction cache use way estimation processing 340, first, by high-frequency execution address acquisition 341, the start and end addresses of a program, whose execution frequency is high, registered in the high-frequency execution address table 122, are acquired. Next, by instruction cache address conversion processing, the start and end addresses are converted into start and end addresses of additional characters used for instruction cache retrieval, respectively. Further, by instruction cache use way record 342, one is added to the use way number in the instruction cache use way table 125 from the start address in the instruction cache to the end address in the instruction cache. The above procedure is repeatedly executed until it is confirmed in end judgment step 343 that record of use ways with respect to all addresses from the start address to the end address registered in the high-frequency execution address table 122.

Figure 13:
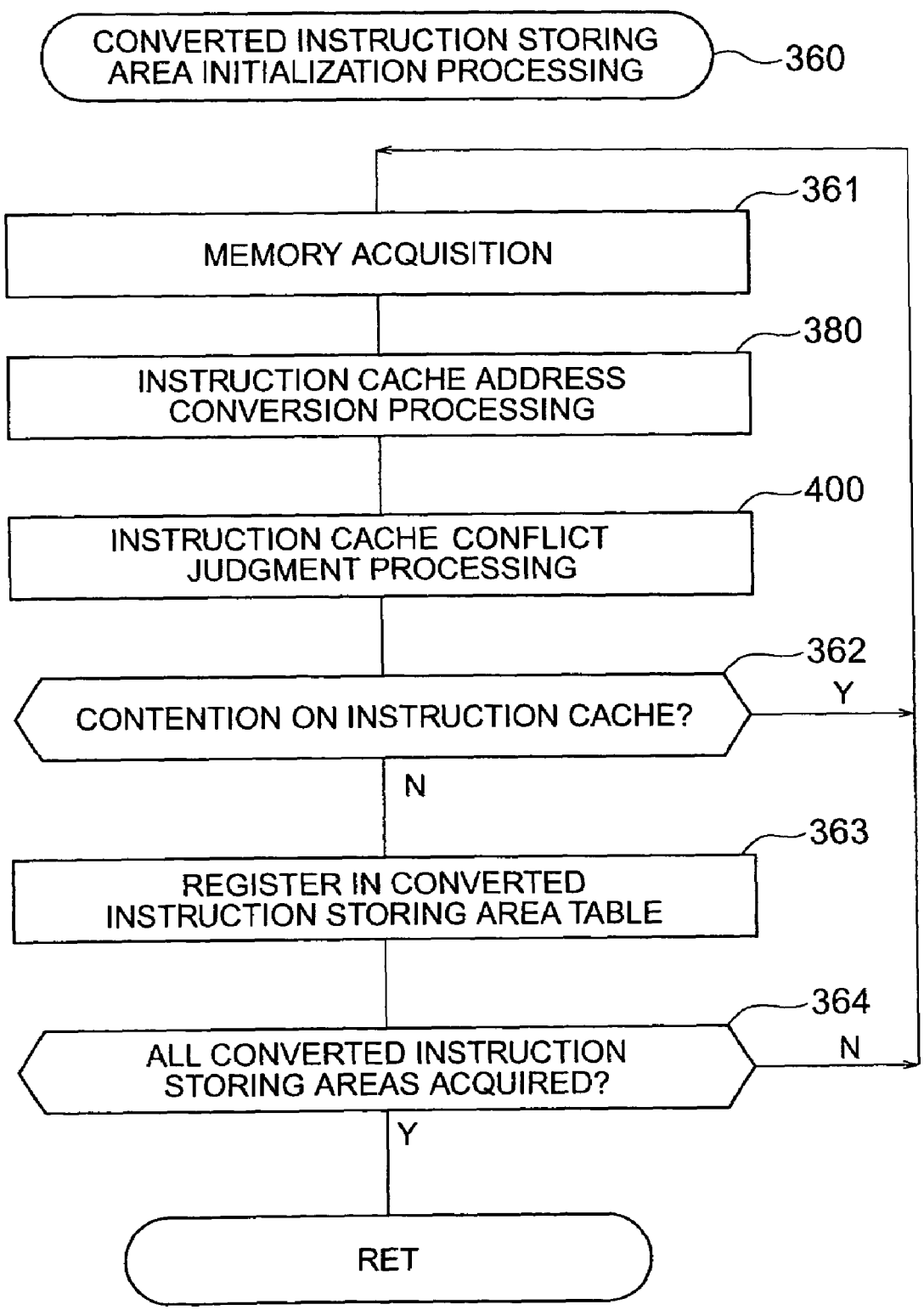
FIG. 13 is a flowchart of converted instruction storing area initialization processing.

FIG. 13 shows details of the converted instruction storing area initialization processing 360. In the converted instruction storing area initialization processing 360, first, by memory acquisition 361, a memory start address having a size corresponding to one element of a converted instruction storing area is acquired using a function such as malloc ( ). A memory end address is calculated out by adding (the size corresponding to one element of the converted instruction storing area-1) to the memory start address. Next, by instruction cache address conversion processing 380, the memory start and end addresses obtained by the memory acquisition 361 are converted into start and end addresses of additional characters used for retrieval in the instruction cache, respectively. Further, by instruction cache conflict judgment processing 400, it is judged whether or not cache conflict occurs between the high-frequency execution program and the instruction cache 101 when the program is executed with the memory obtained by the memory acquisition 361. That is, the instruction cache conflict judgment processing 400 is called using the start and end addresses in the instruction cache as arguments, and presence/absence of cache conflict is obtained as a return value. If cache conflict occurs, the flow returns from step 362 to step 361 for memory acquisition. When no cache conflict occurs, the flow advances to step 363, wherein the memory start address acquired by the memory acquisition 361 is registered at a converted instruction storing address of the converted instruction storing area table 124. The above procedure is repeatedly executed until it is confirmed in end judgment step 364 that all converted instruction storing areas of the converted instruction storing area table 124 have been registered.

Figure 14:
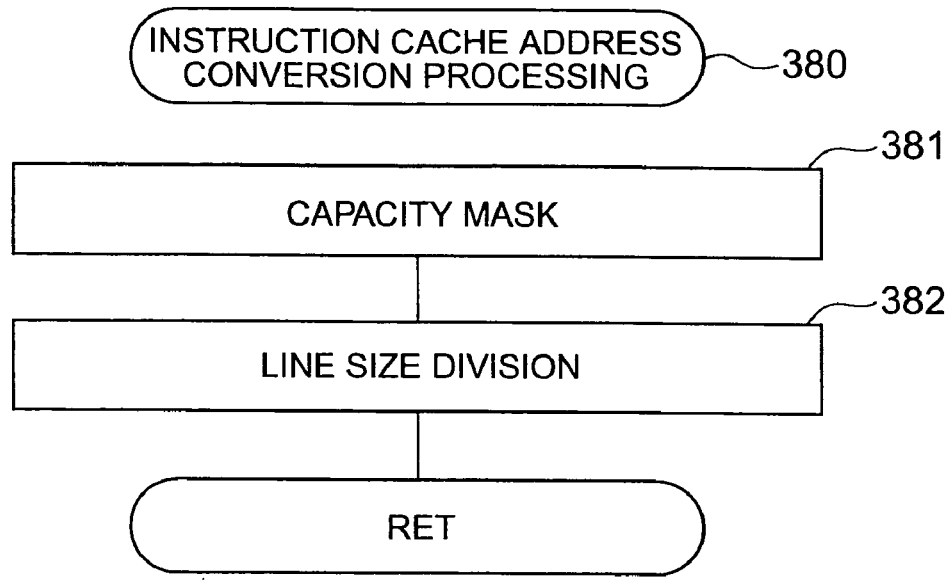
FIG. 14 is a flowchart of instruction cache address conversion processing.

FIG. 14 shows details of the instruction cache address conversion processing 380. In the instruction cache address conversion processing 380, a logical address is received as an input and an additional character in the instruction cache 101 is output as a return value. Although this processing assumes a method in which the cache is retrieved using a logical address as an additional character by an n-way set associative method, conversion into an instruction cache address can be made like this procedure even by another method. First, by capacity mask 381, a logical operation of an input logical address and (the instruction cache capacity of the instruction cache construction table 123-1) is performed, and the result is referred to as a logical address M. Next, by line size division 382, the logical address M/(the instruction cache line size of the instruction cache construction table 123) is calculated, and the result is used as an additional character in the instruction cache. The additional character in the instruction cache is output as a return value.

Figure 15:
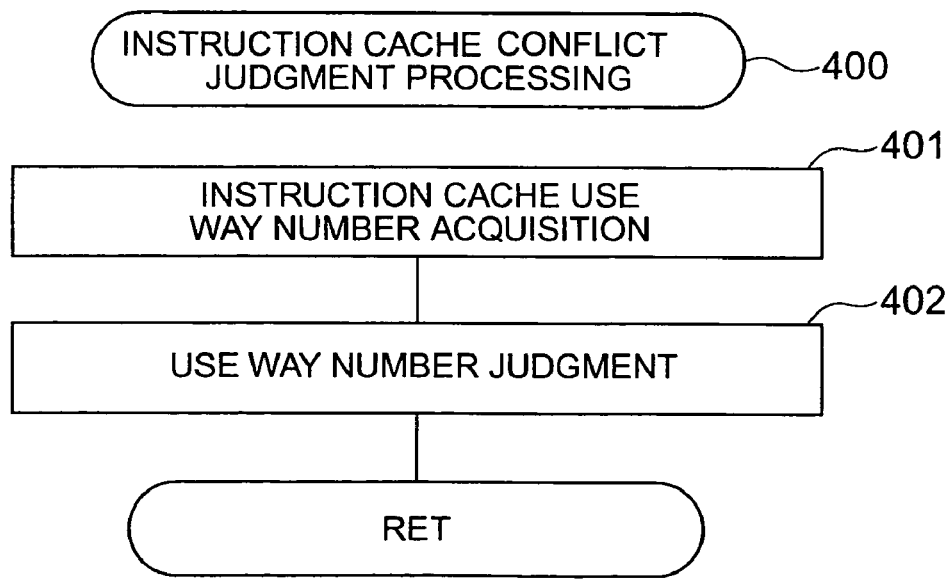
FIG. 15 is a flowchart of instruction cache conflict judgment processing.

FIG. 15 shows details of the instruction cache conflict judgment processing 400. In the instruction cache conflict judgment processing 400, the additional character in the instruction cache is received as an input, and the judgment result whether or not cache conflict with the program whose execution frequency is high occurs in the instruction cache is output. First, by instruction cache use way number acquisition 401, a use way number corresponding to the additional character in the instruction cache is acquired by referring to the instruction cache use way table 125. Next, by use way number judgment 402, the use way number is compared with the instruction cache way number of the instruction cache construction table 123. If the use way number is equal to or smaller than the instruction cache way number, cache conflict is judged not to occur. If the use way number is larger than the instruction cache way number, cache conflict is judged to occur.

FIG. 16 shows details of the conversion execution processing 240. In the conversion execution processing 240, first, by converted instruction retrieval processing 500, a converted instruction in which the instruction address of the converted instruction storing area table 123 is the same as PC (Program Counter) of the processor to emulate is retrieved. If a converted instruction in which the instruction address is the same as PC is present, by converted instruction presence 241, the flow skips instruction conversion processing 520. When no converted instruction in which the instruction address is the same as PC is present, by the converted instruction presence 241, the portion after the instructions described with the first instruction set designated by PC on the memory is converted into an instruction string described with the second instruction set; the converted instruction string is stored at a memory address designated by the converted instruction storing address that is considered to be least used in the converted instruction storing area table 124; and PC is stored at an instruction address of the instruction storing table 123. By emulation end 242, the procedure from the converted instruction retrieval processing 500 to the converted instruction execution processing 540 is repeatedly executed until the emulation ends.

According to the present invention, by performing the instruction cache conflict judgment processing, because the converted instruction storing area that conventionally causes cache conflict in the instruction cache with a high-frequency execution program in the emulation program is not registered in the converted instruction storing area correspondence table, the probability of deterioration of performance attendant upon an instruction cache misses due to cache conflict can be lowered.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A memory management method for an emulator in a computer system, with the computer system having an instruction cache and including a processor capable of interpreting and executing a first instruction set, and a memory, said method being a memory management method carried out in conjunction with a dynamic conversion type program execution in which an emulation program stored in said memory executes a program described with a second instruction set while converting said program at need into a program described with said first instruction set, and, as a procedure for initializing a converted instruction storing area table used for retrieval of an address of a program described with said first instruction set, corresponding to a program described with said second instruction set, said method being carried out by the computer system and comprising operations of:

1) before executing an emulation operation, acquiring address information related to a portion of said emulation program to be executed plural times in the emulation operation;
   2) before executing the emulation operation, specifying, from said address information, a memory address that brings about cache conflict in said instruction cache with said portion, and reserving a storing area in advance that does not conflict with the portion and setting the storing area, which is located at an address other than the specified memory address, to store therein a converted instruction;
   3) before executing the emulation operation, carrying out retrieval with said converted instruction storing area table as to whether or not a program created with the first instruction set, corresponding to a program created with said second instruction set, exists on said memory;
   4) before executing the emulation operation, when a program created with the first instruction set exists, executing the program by said processor; and
   5) before executing the emulation operation, when no program created with the first instruction set exists, converting the program created with said second instruction set into a program created with the first instruction set, storing the converted program within a range of a set storing area of said memory, and storing, in said converted instruction storing area table, a correspondence relation between the storing address of the stored program and the program created with said first instruction set.

2. The memory management method according to claim 1, wherein address information on said portion is high, is embedded in said program at the time when said emulation program is created.

3. The memory management method according to claim 1, wherein said portion includes a converted instruction retrieval processing portion of said emulation program.

4. The memory management method according to claim 1, wherein said portion includes a converted instruction execution processing portion of said emulation program.

5. A computer-readable medium holding an emulation program carried out by a computer system, with the computer system having an instruction cache and including a processor capable of interpreting and executing a first instruction set, and a memory, said program implementing a memory management method carried out in conjunction with a dynamic conversion type program execution in which an emulation program stored in said memory executes a program described with a second instruction set while converting said program at need into a program described with said first instruction set, said program causing said computer system to execute, as a procedure for initializing a converted instruction storing area table used for retrieval of an address of a program described with said first instruction set, corresponding to a program described with said second instruction set, said program being carried out by the computer system and effecting operations comprising:

1) before executing the emulation operation, acquiring address information related to a portion of said emulation program to be executed plural times in the emulation operation;
   2) before executing the emulation operation, specifying, from said address information, a memory address that brings about cache conflict in said instruction cache with said portion, and reserving a storing area in advance that does not conflict with the portion and setting the storing area, which is located at other than the specified memory address, to store therein a converted instruction;
   3) before executing the emulation operation, carrying out retrieval with said converted instruction storing area table as to whether or not a program created with the first instruction set, corresponding to a program created with said second instruction set, exists on said memory;

4) before executing the emulation operation, when a program created with the first instruction set exists, executing the program; and
5) before executing the emulation operation, when no program created with the first instruction set exists, converting the program created with said second instruction set into a program created with the first instruction set, storing the converted program within a range of a set storing area of said memory, and storing, in said converted instruction storing area table, a correspondence relation between the storing address of the stored program and the program created with said first instruction set.

6. A computer system having an instruction cache and including a processor capable of interpreting and executing a first instruction set, and a memory,
  said computer system adapted to effect a memory management method carried out in conjunction with a dynamic conversion type program execution in which an emulation program is described with the first instruction set; and to include a converted instruction storing area table to be used for retrieval of an address of a program described with the first instruction set, corresponding to an address of a program described with a second instruction set,
  said emulation program including:
  initialization processing of initializing said converted instruction storing area table; and
  conversion execution processing in which retrieval is carried out with the converted instruction storing area table as to whether or not a program created with the first instruction set, corresponding to a program created with the second instruction set, exists; when a program created with the first instruction set, corresponding to the program created with the second instruction set, exists, the corresponding program described with the first instruction set is executed by said processor; and when no program created with the first instruction set, corresponding to the program created with the second instruction set, exists, conversion into a program created with the first instruction set, corresponding to the program created with the second instruction set, is executed, the converted instruction is stored in the converted instruction storing area table at an address of a program described with the first instruction set, and information for relating the program created with the first instruction set and the program created with the second instruction set is stored in the converted instruction storing area table,
  said initialization processing being carried out by the computer system and comprising operations of:
  before executing an emulation operation, conducting instruction cache construction acquisition processing of acquiring a construction of the instruction cache of said processor;
  before executing an emulation operation, conducting plural time-execution address acquisition processing of acquiring address information on a program having a high probability of using the instruction cache; and
  before executing an emulation operation, conducting instruction cache conflict judgment processing of judging, from an address of a program described with the first instruction set, corresponding to an address of a program described with the second instruction set, the construction of the instruction cache, address information of the program having the high probability of using the instruction cache, and the construction of the instruction cache of said processor, whether or not the program described with the first instruction set brings about cache conflict in said instruction cache with the program having the high probability of using said instruction cache,
  wherein, when the address of the program, described in the first instruction set, in the converted instruction storing area table is initialized, the memory address judged by instruction cache conflict judgment to bring about cache conflict is excepted and registered at an address of the program, described with the first instruction set, in the converted instruction storing area table.

7. A memory management method for an emulator in a computer system, with the computer system having an instruction cache and including a processor capable of interpreting and executing a first instruction set, and a memory, said method being a memory management method carried out in conjunction with a dynamic conversion type program execution in which an emulation program stored in said memory executes a program described with a second instruction set while converting said program at need into a converted program described with said first instruction set, and, as a procedure for initializing a converted instruction storing area table used for retrieval of an address of a program described with said first instruction set, corresponding to a program described with said second instruction set, said method being carried out by the computer system and comprising operations of:
  1) before executing pending conversion execution processing of any program instructions of the program presently set for emulation, acquiring address information related to a portion of said emulation program to be executed plural times in the emulation operation;
  2) before said executing pending conversion execution processing of any program instructions of the program presently set for emulation, specifying, from said address information, a memory address that brings about cache conflict in said instruction cache with said portion, and reserving a storing area in advance that does not conflict with the portion and setting the storing area, which is located at an address other than the specified memory address, to store therein a converted instruction; and then,
  3) carrying out retrieval with said converted instruction storing area table as to whether or not a program created with the first instruction set, corresponding to a program created with said second instruction set, already exists on said memory via a previously-executed conversion execution processing;
  4) when a program created with the first instruction set already exists, executing the program by said processor; and
  5) when no program created with the first instruction set exists, converting the program created with said second instruction set into a program created with the first instruction set, storing the converted program within a range of a set storing area of said memory, and storing, in said converted instruction storing area table, a correspondence relation between the storing address of the stored program and the program created with said first instruction set.

* * * * *